Dec. 27, 1955
C. A. BRANCKE
2,728,864
PRIME MOVER CONTROL SYSTEM
Filed May 2, 1952
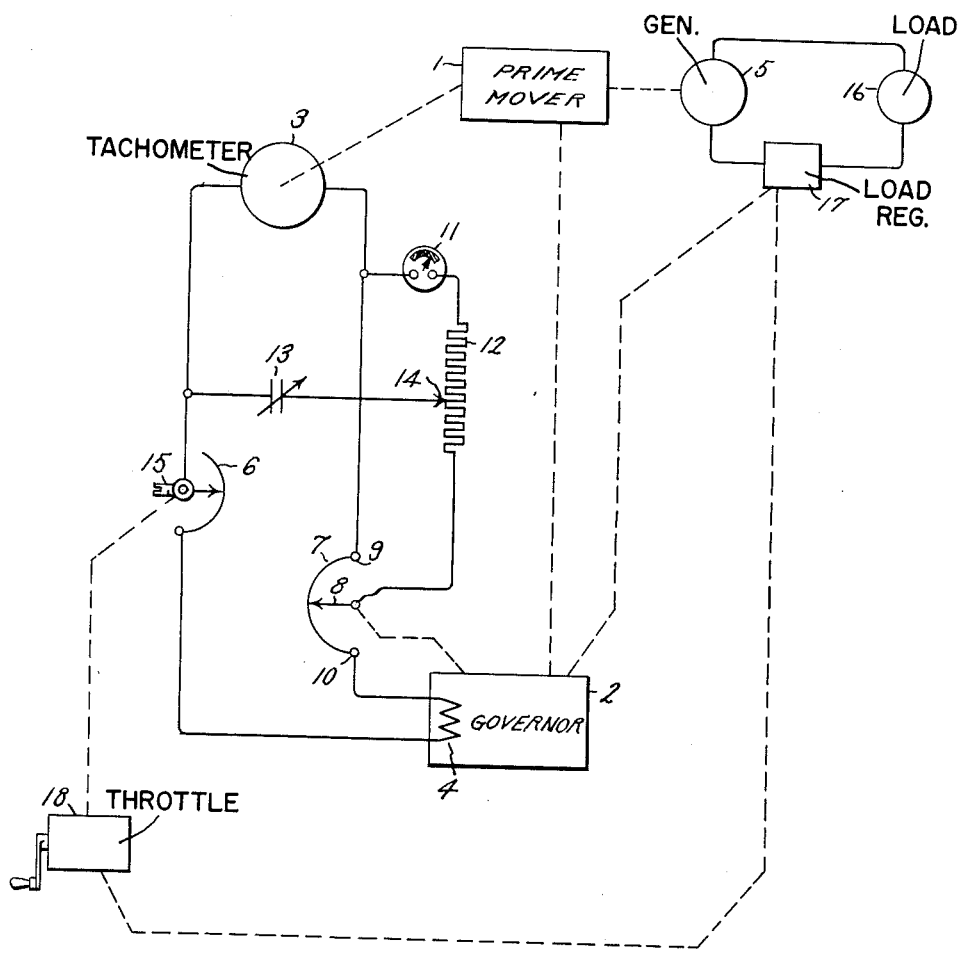
Inventor:
Carl A. Brancke,
by  Bravell S. Mack
His Attorney.

United States Patent Office 2,728,864
Patented Dec. 27, 1955

2,728,864
PRIME MOVER CONTROL SYSTEM

Carl A. Brancke, North East, Pa., assignor to General Electric Company, a corporation of New York Application May 2, 1952, Serial No. 285,823

12 Claims. (Cl. 290—17)

This invention relates to control systems for thermal prime movers, particularly gas turbines, and has particular application in connection with the control of a gas turbine utilized as a prime mover on a self-propelled vehicle such as a gas turbine-electric locomotive.

In the design of self-propelled vehicles utilizing thermal prime movers, such as a gas turbine-electric locomotive, it is customary to provide a governor for controlling the rate of fuel flow to the prime mover and thus to regulate the prime mover speed. In this type of system, the governor is ordinarily of the type which, responsive to a manually effected change in setting to call for an increase in prime mover speed increases the fuel rate to the prime mover and simultaneously reduces the generator load in order that the prime mover may accelerate to the new speed. Subsequently, as the prime mover approaches the called-for speed, the governor reduces the fuel rate and increases the generator load until a stable condition has been reached at which the fuel rate will maintain the desired speed and load.

It is well known that the gas turbine power plant is characterized by its high inertia and thus relatively slow speed response with a result that in a self-propelled vehicle electrical power system utilizing a variable speed gas turbine as the generator prime mover and having a throttle control system which simultaneously increases the power demand for traction and the speed setting of the governor in each notch, almost every throttle advance resulting in an increase in load and simultaneous demand for increase in prime mover speed will result in the governor moving to provide the maximum permissible fuel rate. It is important that no further throttle advance be made to increase load at least until the gas turbine has begun to accelerate in order to prevent stalling the turbine. It is therefore desirable in a gas-turbine-electric locomotive to provide a visual indication to the engineman of the fuel rate provided by the governor so that he will not advance the throttle to increase load until the governor has reduced the fuel rate responsive to the turbine coming up to the called-for speed. It is further desirable to include in the visual indication system an acceleration component so that the engineman may safely utilize all of the available turbine power to obtain better locomotive performance.

It is further well known that the gas turbine is inherently subject to wide variations in output due to variations in ambient temperature and altitude. Approximately equal and constant power and tractive effort increments are desirable in each throttle notch and in order to have the same power available for traction at idling speed, it is necessary that the idling speed be variable from a minimum of approximately 60% to a maximum of approximately 90% of full speed, so that the operator may advance the throttle at the same rate when starting a train regardless of the variations in maximum power plant output.

The object of this invention is therefore to provide a control system for a thermal prime mover, particularly a gas turbine, incorporating the features enumerated above as being desirable.

Further objects and advantages of this invention will become apparent and the invention will be better understood by reference to the following description and the accompanying drawing and the features of novelty which characterize this invention will be pointed out with particularity in the claims annexed to and forming a part of this specification.

In accordance with this invention, a thermal prime mover, such as a gas turbine, is connected to drive a generator and is provided with a governor for controlling the fuel flow to regulate the prime mover speed. A manually actuated throttle simultaneously changes the speed setting of the governor and the power demand of the generator. Means for deriving a voltage proportional to the speed of the prime mover is provided, such as a tachometer generator and means are also provided for deriving from the speed voltage a voltage inversely proportional to the fuel rate established by the governor. In order to provide a visual indication of the condition suitable for a throttle advance, the voltage inversely proportional to the fuel rate is measured, for example, by a voltmeter. More specifically, a tachometer generator is connected to the prime mover to provide a speed signal and a throttle is arranged to selectively vary the voltage output required of the generator, as by means of a rheostat, for varying the speed setting of the governor. Means, such as a potentiometer in series with the generator is provided to derive a voltage proportional to the generator voltage and means are also provided to derive another voltage from the derived voltage inversely proportional to the fuel rate established by the governor. Such a means may be a movable tap on the potentiometer operated by the governor in response to the fuel rate established thereby. The visual indication is provided by a voltmeter connected to read the inversely proportional voltage. Thus, when a throttle advance increases the generator load and simultaneously calls for an increase in speed, resulting in the governor calling for the maximum fuel rate, the governor also moves the potentiometer tap to the extreme position so that the voltage measured by the voltmeter will be zero. Dropping of the voltmeter to zero provides indication to the engineman that he cannot further increase the generator load and speed demand. However, when the prime mover reaches the called-for speed, with a corresponding decrease in fuel rate established by the governor, the potentiometer tap will be moved so that the voltmeter reading will increase. At a predetermined point, the engineman may again advance the throttle to increase the generator load and to call for a further prime mover speed increase.

As a further feature of this invention, a voltage is derived proportional to the rate of acceleration of the prime mover and utilized to modify the voltage applied to the meter so that the meter will not fall all the way to zero. This provides a signal that the power plant is accelerating and that the engineman may safely increase generator load thus permitting him to advance the throttle more rapidly than would otherwise be indicated by the meter. This means may include a capacitor connected from one side of the tachometer generator to a tap on an external resistor connected in series with the voltmeter. Current will flow through the capacitor only when the tachometer generator voltage is changing. This current flow will bias the current through the meter in a direction to prevent the meter from moving to zero as long as the prime mover is accelerating.

In order to provide for adjustment of the turbine idling speed without affecting the top speed setting, means are provided, such as a throttle operated rheostat in series with the tachometer for varying the speed voltage applied to the governor. The contact arm of this rheostat has a further adjustment to preset the initial position thereof and thus the idling speed of the turbine. Thus, with idling speed set at 60% of full speed, maximum turbine speed may be reached with the full number of throttle notches while with the idling speed set at 90% of full speed, maximum turbine speed may be reached with a very few throttle notches. In each case, an equal speed increment is provided in each throttle notch.

The single figure of the drawing schematically illustrates the improved thermal prime mover control system of this invention.

Referring now to the drawing, there is shown a thermal prime mover 1, such as a gas turbine mechanically connected to drive a generator 5. The prime mover 1 is arranged to be regulated by a suitable governor shown schematically at 2. The governor 2 shown here schematically may be of any suitable type well known in the art and does not form a part of this invention. Such a governor is described in Patent 2,558,592 of Neil E. Starkey, Carl B. Lewis and Martin A. Edwards issued June 26, 1951, and assigned to the assignee of the present application. The prime mover 1 is also mechanically connected to drive a suitable tachometer generator 3 which is in turn connected to a speed coil 4 in the governor 2. A throttle operated rheostat 6 connected to be operated by a suitable throttle 18 is arranged in series between the generator 3 and the speed coil 4 of governor 2. The rheostat 6 also has a manual adjustment of its initial position, as by set screw 15. A potentiometer 7 is also arranged in series between the tachometer generator 3 and the governor speed coil 4 as will be hereinafter described.

In operation, with the rheostat 6 set for a desired idling speed by adjustment of set screw 15 and further set for a desired operating speed above the idling speed by manipulation of throttle 18 and assuming that the turbine 1 is operating at that speed, it will be apparent that a reduction in the speed of the prime mover 1 will result in a lower voltage appearing across speed coil 4 with the result that the governor will automatically increase the fuel rate to the prime mover to bring the prime mover back to the desired speed. As the speed increases, the voltage generated by the tachometer generator 3 will also increase thus restoring the stable condition. Assuming now that it is desired to increase the prime mover speed, the rheostat 6 is operated by the throttle 18 to increase the resistance in series between the generator 3 and the speed coil 4. This again reduces the voltage applied across the governor speed coil 4 with a result that the governor will call for an increased fuel flow to correct the condition. As the prime mover comes up to the new speed, the voltage generated by the tachometer generator 3 will again increase to restore the voltage across the speed coil 4 thus reducing the fuel flow to the value which will maintain the stable condition with the speed called for.

Generator 5 is electrically connected to a load 16, such as a traction motor with a suitable load regulating device, shown schematically at 17 arranged in circuit therewith. Throttle 18, in addition to setting rheostat 6 to call for a desired prime mover speed, also sets regulator 17 to vary the generator load. This feature does not form a part of this invention and a suitable arrangement for simultaneously regulating the governor setting and generator load is found in copending application Serial No. 291,926, filed June 5, 1952, of Marvin A. Kohloff, now issued as Patent 2,683,817 and assigned to the assignee of this application. Governor 2 is also arranged to reduce the generator load responsive to fuel rates above a predetermined level and such an arrangement of governor load control is shown in my copending application, Serial No. 294,677, filed June 20, 1952, now Patent No. 2,658,152, issued November 3, 1953, also assigned to the assignee of the present application.

In order to provide a visual indication to the engineman that the gas turbine 1 has reached a desired speed so that he may move the throttle 18 to call for a further increase in generator load and speed, the movable tap 8 of the potentiometer 7 is mechanically connected to be operated by the governor 2 with the tap thus being moved responsive to the fuel rate called for by the governor. Thus, when the governor is calling for a maximum rate of fuel flow, the movable tap 8 of potentiometer 7 will move to the extreme end 9 thereof while at idling speed with minimum fuel flow being called for, the movable tap 8 will move to the other extreme end 10 of the potentiometer 7. It will be readily apparent that the voltage drop across the potentiometer 7 is proportional to the speed voltage generated by the tachometer generator 3 while the voltage drop between the extreme end 9 of the potentiometer 7 and the movable tap 8 is inversely proportional to the rate of fuel flow established by the governor 2. The visual indication is therefore provided by connecting voltmeter 11 across the end 9 of the potentiometer 7 and the movable tap 8.

It will thus be readily seen that prior to the time the prime mover 1 comes up to the called-for speed, and while movable tap 8 is at extreme end 9 of potentiometer 7, there will be no voltage differential between movable tap 8 and the extreme end 9 of potentiometer 7. When the turbine comes up to the called-for speed, however, the governor moves tap 8 toward the extreme end 10 of potentiometer 7, thus producing a voltmeter indication and the voltmeter face may be suitably marked to indicate when the engineman may advance the throttle 18 to call for an increase in load and speed. A suitable marking for such a voltmeter indication might be to have the face marked red for the voltmeter reading from 0 to 5% of the capacity of the voltmeter, yellow from 5 to 50% of the capacity of the voltmeter and green from 50% to the maximum reading of the voltmeter. Thus the engineman will know that when the indicator is within the red region there is likely to be trouble such as the stalling of the prime mover. When he is operating the prime mover in the yellow region the engineman will have to be aware of the danger that the prime mover may be overloaded. When the engineman finds the reading in the green area he can accelerate the throttle at his convenience. When the meter indicates a safe condition, the engineman will advance the throttle to call for an increased load and speed. As soon as the throttle 18 is again advanced, the governor 2 may again go into full load control to call for maximum fuel rate and to reduce the generator load thus causing the movable tap 8 to again move to the extreme position 9 of the potentiometer 7, thus causing the voltmeter 11 to once more fall to zero. This indicates to the engineman that he may not advance the throttle 18 to call for further increase in load until the voltmeter 11 has again risen to the level at which another notch is permitted. As the prime mover approaches the called-for speed, the governor decreases the fuel rate thus causing the movable element 8 to move away from the extremity 9 of the potentiometer 7 so that the voltmeter 11 indicates an increased voltage. At a predetermined voltage indication marked on the face of the meter, the engineman may again advance the throttle 18 to increase the load and to call for further speed increase and the cycle is repeated.

It is readily apparent that in the event the prime mover is accelerating, the throttle 18 may safely be moved to increase load and to call for increases in speed. In order to modify the reading of the meter 11 to indicate that the prime mover is accelerating, and thus to permit the engineman more effectively to utilize the power available in the prime mover, a capacitor 13 is connected from the tap 14 of the voltmeter external resistor 12 to the other side of the tachometer generator 3. When the tachometer 3 is accelerating, its voltage output is increasing at a rate proportional to the increase in speed. Current will flow through the capacitor 13 only when the tachometer generator 3 produces a changing voltage. It is thus seen that when the prime mover is accelerating, a voltage component proportional to the rate of acceleration of the prime mover will appear across the capacitor 13 as a charging current and be impressed upon the voltmeter 11 through a portion of its series resistor 12. The setting of the tap 14 will determine the proportion of the charging current that passes through the meter 11 as compared to the current in the lower portion of the resistor 12. This acceleration component will prevent the voltmeter 11 from falling completely to zero even though the movable tap 8 has moved to the extremity 9 responsive to the governor calling for maximum fuel rate. The voltmeter 11 will therefore indicate that the prime mover is accelerating and the engineman may then safely advance the throttle to increase load and to call for a further increase in speed.

It will be readily apparent that the rheostat 6 not only provides variation in the speed signal to the governor 2 to call for the desired speed, but also by virtue of its independent adjustment of initial position of the contact arm by set screw 15, provides adjustment of the idling speed. It will be readily apparent that with idling speed set at a maximum of approximately 90% of full speed, full speed will be obtained with a relatively few number of notches of throttle 18, for example 5, whereas with the idling speed set at a minimum of approximately 60% of full speed, full speed will not be obtained until a larger number of notches, for example, 20.

It will be readily apparent that indicating means other than a voltmeter may be utilized to advise the engineman of the governor position. Further, this invention by providing a visual indication of every movement of the governor, serves to give immediate warning of power plant trouble which could cause the governor to go into full load control.

It will now be readily apparent that this invention provides an improved control system for a thermal prime mover such as a gas turbine wherein a visual indication is provided for the engineman warning against calling for increased load and speed at a time when such a called-for increase might stall the turbine. This invention further provides even increments of prime mover speed regardless of the idling speed necessitated by the temperature and altitude in which the locomotive is operated.

While I have shown and described a particular embodiment of this invention, further modifications and improvements will occur to those skilled in the art. I desire it to be understood therefore that this invention is not limited to the form shown and I intend in the appended claims to cover all modifications which do not depart from the spirit and scope of this invention.

What I claim as new and desire to secure by Letters Patent of the United States is:

1. A control system for a thermal prime mover comprising a governor arranged to control the fuel flow to said prime mover thereby to regulate the speed thereof, throttle means connected to said governor and arranged selectively to vary the setting thereof for regulating the speed of said prime mover, means connected to said prime mover and operable thereby to derive a first voltage proportional to the speed of said prime mover, means connected in circuit with said last-named means and said governor and operable by said governor to derive another voltage from said first voltage responsive to the fuel rate established by said governor, and means connected to said last-named means and arranged to measure said second voltage to indicate a condition suitable for an advance of said throttle to call for a higher prime mover speed.

2. A control system for a thermal prime mover comprising a governor arranged to control the fuel flow to said prime mover to regulate the speed thereof, throttle means connected to said governor and arranged selectively to vary the setting thereof, means connected to said prime mover and operable thereby to derive a voltage proportional to the speed of said prime mover, means connected in circuit with said last-named means and operable by said governor arranged to modify said voltage in response to the fuel rate established by said governor, and means connected to said last-named means arranged to measure the resultant voltage to indicate a suitable condition for advance of said throttle to call for a higher prime mover speed.

3. A control system for a thermal prime mover comprising a governor arranged to control the fuel flow to said prime mover to regulate the speed thereof, throttle means connected to said governor and arranged selectively to vary the setting thereof, means connected to said prime mover and operable thereby to derive a voltage proportional to the speed of said prime mover, means connected in circuit with said last-named means and operable by said governor to modify said voltage in response to the fuel rate established by said governor, means connected to said last-named means arranged to measure the resultant voltage to indicate a suitable condition for advance of said throttle to call for a higher prime mover speed, and means connected in circuit with said deriving means and said measuring means arranged to impress a voltage responsive to the rate of acceleration of said prime mover upon said measuring means.

4. A control system for a thermal prime mover comprising a governor arranged to control the fuel flow to said prime mover to regulate the speed thereof, means connected to said prime mover arranged to generate a voltage proportional to the speed thereof, said generating means being connected to said governor to provide a speed signal thereto, throttle means connected to said governor and arranged selectively to vary said voltage for varying the setting of said governor, means connected in circuit with said generating means to derive a voltage proportional to said generated voltage, means connected to said governor and operable thereby to derive another voltage from said derived voltage responsive to the fuel rate established by said governor, and means connected to said last-named means and arranged to measure said other voltage to indicate a suitable condition for advance of said throttle to call for a higher prime mover speed.

5. A control system for a thermal prime mover comprising a governor arranged to control the fuel flow to said prime mover to regulate the speed thereof, means connected to said prime mover arranged to generate a voltage proportional to the speed of said prime mover, said generating means being connected to said governor to provide a speed signal thereto, throttle means connected to said governor and arranged selectively to vary said voltage for varying the setting of said governor, means connected in circuit with said generating means arranged to derive a voltage proportional to said generated voltage, means connected to said governor and operable thereby to derive another voltage from said derived voltage responsive to the fuel rate established by said governor, means connected to said last-named means arranged to measure said other voltage to indicate a suitable condition for advance of said throttle to call for a higher prime mover speed, and means connected in circuit with said generating means and said measuring means arranged to impress a voltage responsive to the rate of acceleration of said prime mover upon said measuring means.

6. A control system for a thermal prime mover connected to a load and comprising a governor arranged to control the fuel flow to said prime mover to regulate the speed thereof, means connected to said prime mover arranged to generate a voltage proportional to the speed of said prime mover, said generating means being connected to said governor to provide a speed signal thereto, throttle means connected to said governor and arranged selectively to vary said voltage for varying the setting of said governor to regulate the speed of said prime mover, said throttle means being connected to simultaneously vary said load, means connected in circuit with said generating means arranged to derive a voltage proportional to said generated voltage, means connected to said governor and operable thereby to derive another voltage from said derived voltage responsive to the fuel rate established by said governor, and means connected to said last-named means arranged to measure said other voltage to indicate a suitable condition for advance of said throttle to increase said load and to call for a higher prime mover speed.

7. A control system for a thermal prime mover comprising a governor arranged to control the fuel flow to said prime mover for regulating the speed thereof, generating means operated by said prime mover and arranged to generate a voltage proportional to the speed thereof, said generating means being connected to said governor to provide a speed signal thereto, means connected in circuit between said generating means and said governor and arranged selectively to vary said voltage for varying the setting of said governor, throttle means connected to said varying means for manually operating the same, means connected in circuit with said generating means arranged to derive a voltage proportional to said generated voltage, means connected to said governor and operable thereby in response to the fuel rate established by said governor arranged to derive another voltage from said derived voltage, and means connected to said last-named means arranged to measure said other voltage to indicate a suitable condition for advance of said throttle to call for a higher prime mover speed.

8. A control system for a thermal prime mover comprising a governor arranged to control the fuel flow to said prime mover for regulating the speed thereof, generating means operated by said prime mover and arranged to generate a voltage proportional to the speed thereof, said generating means being connected to said governor to provide a speed signal thereto, means connected in circuit between said generating means and said governor and arranged selectively to vary said voltage for varying the setting of said generator, throttle means connected to said varying means for manually operating the same, means connected in circuit with said generating means arranged to derive a voltage proportional to said generated voltage, means connected to said governor and operable thereby in response to the fuel rate established by said governor arranged to derive another voltage from said derived voltage, means connected to said last-named means arranged to measure said voltage to indicate a suitable condition for advance of said throttle to call for a higher prime mover speed, and means connected in circuit with said generating means and said measuring means arranged to bias said measuring means with a voltage proportional to the rate of acceleration of said prime mover.

9. A control system for a thermal prime mover comprising a governor arranged to control the fuel flow to said prime mover to regulate the speed thereof, throttle means connected to said governor arranged selectively to vary the setting of said governor, means connected to said governor and operable thereby arranged to derive a voltage responsive to the fuel rate established by said governor, means connected to said deriving means arranged to measure said voltage to indicate a suitable condition for an advance of said throttle to call for a higher prime mover speed, and means operable in response to said prime mover arranged to bias said measuring means responsive to the rate of acceleration of said prime mover.

10. A control system for a thermal prime mover comprising a governor arranged to control the fuel flow to said prime mover for regulating the speed thereof, generating means operated by said prime mover and arranged to generate a voltage proportional to the speed thereof, said generating means being connected to said governor to provide a speed voltage thereto, a variable resistance connected in series between said generator member and said governor and arranged selectively to vary said voltage for varying the setting of said generator, throttle means connected to operate said variable resistance, a potentiometer connected in series between said generating means and said governor for deriving a voltage proportional to said generated voltage and having a movable tap, said tap being connected to said governor and operable thereby in response to the fuel rate established by said governor to derive another voltage from said potentiometer, and a voltmeter connected across said movable tap and one extremity of said potentiometer for indicating a suitable condition for advance of said throttle to call for a higher prime mover speed.

11. A control system for a thermal prime mover comprising a governor arranged to control the fuel flow to said prime mover for regulating the speed thereof, generating means operated by said prime mover and arranged to generate a voltage proportional to the speed thereof, said generating means being connected to said governor to provide a speed voltage thereto, a variable resistance connected in series between said generator member and said governor and arranged selectively to vary said voltage for varying the setting of said generator, throttle means connected to operate said variable resistance, a potentiometer connected in series between said generating means and said governor for deriving a voltage proportional to said generated voltage and having a movable tap, said tap being connected to said governor and operable thereby in response to the fuel rate established by said governor to derive another voltage from said potentiometer, a voltmeter connected across said movable tap and one extremity of said potentiometer for indicating a suitable condition for advance of said throttle to call for a higher prime mover speed, a resistance connected in series with said voltmeter and having a tap, and a capacitor connected across said tap and the side of said generating means remote from said potentiometer for deriving an acceleration voltage proportional to the rate of acceleration of said prime mover whereby said acceleration voltage is impressed on said voltmeter.

12. A control system for a thermal prime mover mechanically connected to a generator, said generator being connected to a load, said system comprising a governor arranged to control the fuel flow to said prime mover for regulating the speed thereof, tachometer generating means operated by said prime mover and arranged to generate a voltage proportional to the speed thereof, said generating means being connected to said governor to provide a speed voltage thereto, a variable resistance connected in series between said generator member and said governor and arranged selectively to vary said voltage for varying the setting of said governor to regulate the speed of said prime mover, throttle means connected to said variable resistance for manually operating the same, said throttle means being connected to simultaneously vary said load, a potentiometer connected in series between said generating means and said governor for deriving a voltage proportional to said generated voltage and having a movable tap, said movable tap being connected to said governor and operable thereby in response to the fuel rate established by said governor to derive another voltage from said potentiometer, and a voltmeter connected across said movable tap and one extremity of said potentiometer to indicate a suitable condition for advance of said throttle to increase said load and to call for a higher prime mover speed.

References Cited in the file of this patent

UNITED STATES PATENTS

| | | |
|---|---|---|
| 1,709,104 | Wilhjelm | Apr. 16, 1929 |
| 2,193,114 | Seippel | Mar. 12, 1940 |
| 2,336,232 | Doran | Dec. 7, 1943 |
| 2,393,482 | Smith | Jan. 22, 1946 |
| 2,482,254 | Fairchild | Sept. 20, 1949 |
| 2,489,871 | Edwards | Nov. 29, 1949 |
| 2,510,753 | Multhaup | June 6, 1950 |
| 2,558,592 | Starkey et al. | June 26, 1951 |
| 2,558,866 | May et al. | July 3, 1951 |
| 2,581,276 | Mock | Jan. 1, 1952 |
| 2,658,152 | Brancke | Nov. 3, 1953 |